Nov. 3, 1964 W. H. STEWART 3,154,999

SELF SETTING FLEXIBLE HEAD STAPLE

Filed Sept. 14, 1961 2 Sheets-Sheet 1

INVENTOR
WILLIAM H. STEWART by Charles R Fay

ATTORNEY

Nov. 3, 1964 W. H. STEWART 3,154,999

SELF SETTING FLEXIBLE HEAD STAPLE

Filed Sept. 14, 1961 2 Sheets-Sheet 2

INVENTOR
WILLIAM H. STEWART by Charles R. Fay

ATTORNEY

United States Patent Office 3,154,999
Patented Nov. 3, 1964

3,154,999
SELF SETTING FLEXIBLE HEAD STAPLE
William H. Stewart, % King Mfg. Co., Jaffrey, N.H.
Filed Sept. 14, 1961, Ser. No. 138,065
5 Claims. (Cl. 85—49)

This application is a continuation-in-part of my patent application Serial No. 801,755, filed March 25, 1959, now abandoned.

This invention relates to a new and improved staple and particularly to the head of the staple, and the principal object of the invention resides in the improvement of a deformable headed staple used principally to fasten electric cables, soft copper tubing, and similar articles which have a soft exterior and are apt to be damaged by staples now in use.

When a staple is driven into a wood base with a hammer, the driving shoulders at the tops of the legs of present staples continue to pull the staple head which extends between the legs, through the soft covering on the cable, as long as these shoulders are struck with a hammer, and therefore the operator or electrician is in a position where he has to depend on his own knowledge and experience when to stop striking the staple with the hammer or he will damage the covering and even sever the cable covering with the present rigid type staples now in use; or if he stops the hammering too soon, he will provide a poor holding device. Because of this fact, many electrical inspectors will not allow the prior art staples to be used in his jurisdiction.

The present invention provides a staple which has a thin, flat, deformable, or shape changing metal head or connection between the two knobs which form the driving members for the staple, combined with an optional control means formed in the center portion of the new staple head; and the provision of a new staple head embodying a thinner and more deformable head than those of the prior art but which at the same time is controlled as to the hammering operation thereof by the control means aforesaid; and the provision of a control means as above described in the form of a thin, malleable, deformable, shape-changing center section which rises above the two driving knobs at the ends of the thin, deformable portion of the flexible staple head.

A further object of the invention resides in the provision of a staple of the class described in which the central portion of the head which connects the two legs of the staple is angularly depressed into a thin, easily deformable flat, wide surface which conforms itself to the cable being secured in position, thus providing a pair of relatively raised striking shoulders which extend upwardly or outwardly beyond the center of the head itself, these shoulders having hammer fitting slanting top surfaces facing inwardly or toward each other relative to the staple legs for the purpose of stabilizing a hammer blow on the staple when it is driven from any angle and providing for a central high point hammer-contact portion for each leg, and also conforming to the convex surface found in faces of most hammers and which therefore tend to prevent the staple from being driven crookedly for from slipping sideways on contact with the hammer.

Other objects and advantages of the invention will appear hereinafter.

Reference is to be had to the accompanying drawings, in which

Figure 2:
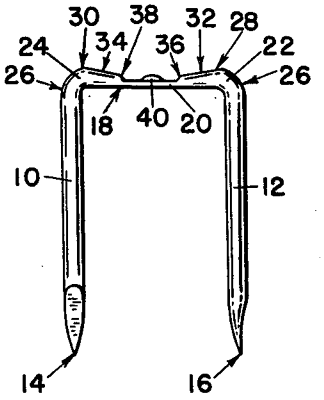
FIG. 2 is a view in front elevation thereof.
Figure 5:
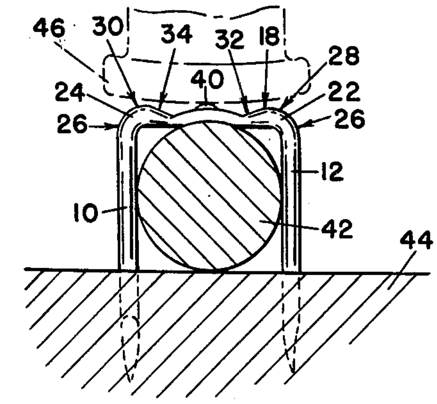
FIG. 5 illustrates the hammer applied to the controlling knob or button with the staple in final position.
Figure 8:
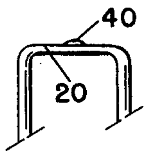
Figure 23:
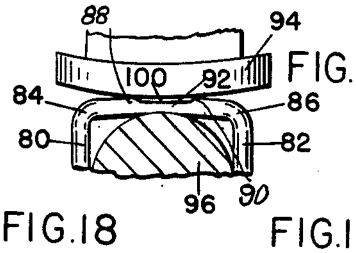
Figure 21:
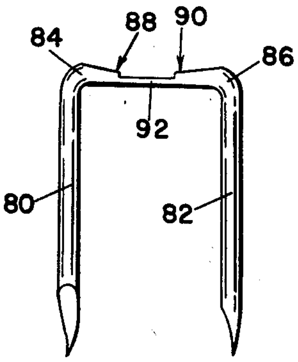
Figure 22:
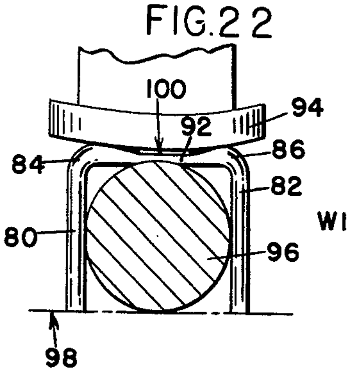

FIGS. 12 to 20 inclusive show further modifications including insulator devices for application to the staples;

FIG. 21 is a view similar to FIG. 2 but showing a modification;

FIG. 22 is a view similar to FIG. 5 but showing the initial action derived from the construction of FIG. 21, and FIG. 23 is a similar view showing the final action thereof.

Reference is made to my Patent No. 2,887,004, issued May 19, 1959, showing staples of the rigid type. The present case presents an improvement in flexible type staples.

Figure 1:
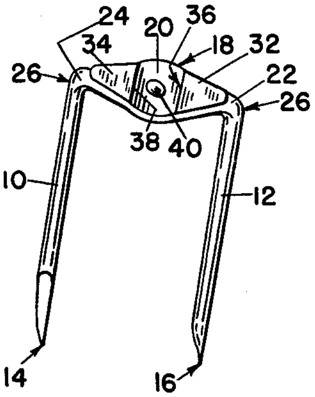
FIG. 1 is a perspective view of the new staple.

In carrying out the present invention, the staples may be made in any way desired as by molding, forging, casting, etc. However, in actual practice it is proposed to make the same out of flat or round wire as is customary in the staple art. In FIG. 1, there is shown one form of the new invention including the legs 10 and 12, each being sharpened as at 14, 16 more or less in the customary manner. These legs are connected by the staple head which is herein indicated generally by the reference numeral 18 and this head is formed from the wire by a cold-forming process which will be clear to those skilled in the art.

Figure 3:
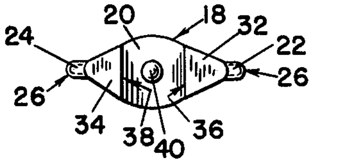
FIG. 3 is a top plan view.

The head is centrally flat as indicated at 20 as clearly shown in FIG. 2, and this flattening process provides a thin, deformable widened member which can extend to any width from leg-to-leg, the general proportions of which are perhaps best seen in FIG. 3. This flattening process depresses the head and provides for a pair of raised striking heads or shoulders 22 and 24, these being directly in line with the legs 10 and 12, so that when the staple is struck with a hammer, the driving force is imparted to the legs susbtantially centrally thereof in a longitudinal direction. The flat 20 may be as long or short as desired as long as the driving knobs or shoulders are no wider than the width of a hammer. Attention is directed to FIGS. 6 to 11 showing variations of this dimension as well as other modifications.

In the present case, these heads are rounded at their outer side portions as at 26, 26 (FIG. 2); and rise to their greatest heights at points 28 and 30, thereupon slanting downwardly as at 32, 34 towards the center, i.e., towards the depressed central flat head 20. These slanting surfaces 32 and 34 may extend smoothly into the upper surface of the flat head 20 or they may terminate as is indicated in FIG. 3 in small abrupt shoulders 36 and 38.

In any event, the points 28 and 30 are arranged substantially centrally or axially of the respective legs 10 and 12 and since these are the highest points of the entire staple, they will ordinarily be contacted by the hammer, and by being at the center of each leg, they carry the hammer blows straight down to the points.

Figure 4:
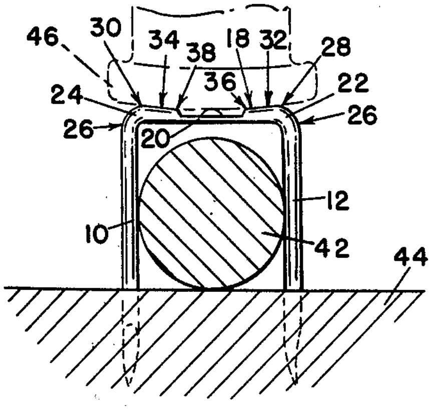
FIG. 4 illustrates the new staple being applied to hold a member in position.

Furthermore, since most hammers possess a convex face surface, this normally fits into the slanting surfaces 32 and 34 in such a way as to prevent any crooked driving of the staple and preventing the staple from slipping sideways on contact therewith. This action is best seen in FIG. 4. Also, this way of hammering the staple in position prevents unwanted flexure of the thin head 20 until such time as such deforming is desired as will be later described.

Generally centrally at the upper surface of the depressed flat head 20, there is provided an optional protrusion, knob, or button 40 which may be of any desired conformation but as disclosed is conveniently rounded. This button is referred to as an additional "control device" and it renders additional speed to the deformability qualities of the flexible staple head into a self-setting head which will not cut any soft covers and which prevents the hammer from driving the legs in too far.

This effect is best seen from a comparison of FIGS. 4 and 5. In FIG. 4, the cable or other object 42 is being connected by the staple to a wall 44 and it will be seen that the hammer 46 strikes the upper portion of the shoulders 22 and 24 as above described and starts to drive the staple straight into the wall 44 with a leg of the staple at each side of the cable 42.

When the lower surface of the flattened deformable head 20 contacts the cable or other object 42, it is deflected relatively upwardly and higher in relation to the striking shoulders 22 and 24, and assumes the conformation of the cable covering as plainly shown in FIG. 5. A further hammer blow therefore will strike only the center of the head 40 and not the striking shoulders 22 and 24, and therefore the legs 10 and 12 are seated as far as is necessary and the operator is at once apprised of the fact that the cable is held firmly in position and that no more hammer blows are necessary.

The central part of the deformable head 40 rises relatively speaking on contact with the cable to keep the hammer blow from the driving shoulders and legs, making it impossible to drive the staple any deeper and stopping all progress of the legs 10 and 21 so that the final position of the staple is uniformly substantially as shown in FIG. 5.

This provides a self-setting staple having a shape-changing head which will not cut any soft covers and which cannot be driven in too far as prior art staples may be. Thus for the first time there is provided a self-setting, deformable staple head which greatly improves the action in providing the connection for the cable to the wall; they are driven in straight instead of some being crooked one way or another; and most important of all, the soft covering of the electric cable or the soft copper tubing is completely protected and is not cut in any way by the staple head being stiff, rigid or driven crooked or too far. Also, the non-slip slanting heads on the striking shoulders provide for a much more stable staple, particularly when driving the staple in straight to the contact position as shown in FIG. 5.

Figure 6:
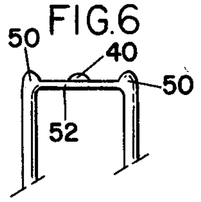
FIGS. 6 to 11 illustrate modifications.
Figure 7:
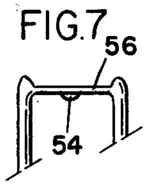
Figure 9:
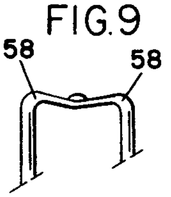
Figure 10:
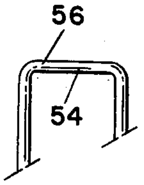

Other modifications are possible, as illustrated in FIGS. 6 to 11 inclusive. In FIG. 6, the striking shoulders 50 are not particularly slanted and the flat 52 is relatively long, thus allowing a larger space between the hammer and the deformable head for the deforming action to take place. In FIGS. 7 and 10, the control device 54 is located at the under side of the deformable flat head 56 and the striking shoulders are omitted in FIG. 10, as also in FIG. 8.

Figure 11:
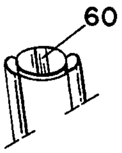

In FIG. 9, the shoulders 58 are slanted but merge into the flexible flat smoothly in a wide V-shape. Also, the fact that the additional control device may be in cross-bar form (from edge to edge) is shown in FIG. 11 at 60. However, the action in all cases is similar and is readily apparent from the foregoing.

Figure 12:
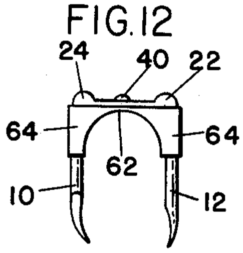
Figure 13:
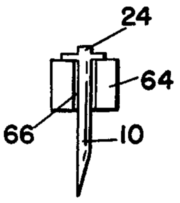
Figure 14:
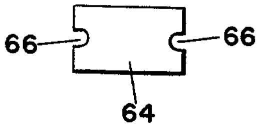
Figure 15:
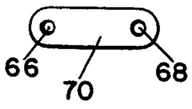

FIGS. 12, 13 and 14 illustrate a modification in which the staple, as for instance in FIGS. 1 and 2, is provided with an insulator which may conveniently be made of molded plastic and comprises a head or bridge member at 62 connecting a pair of leg members 64, 64 which enclose or partially enclose the legs 10 and 12 of the staple. In FIG. 14, the insulator is shown as having recesses at 66 for accommodating the legs 10 and 12. The use of this device is exactly the same as above described with relation to the staple of FIG. 1, but in this case the plastic insulator will also conform to the pipe or conduit or cable which is being secured in position, and forms not only an insulative means but a cushion means to further prevent any kind of injury which might be occasioned with respect to the cable, etc. This device may also be provided with leg holes as illustrated at 68 with respect to an insulator having a head or bridge 70, the leg holes of course being used to accommodate the spikes of the staple. In any case, if the legs of the staple are toed in slightly at the points, the insulators will be locked in position.

Figure 16:
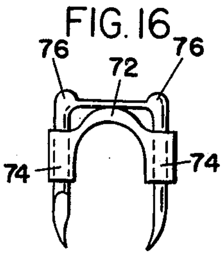
Figure 17:
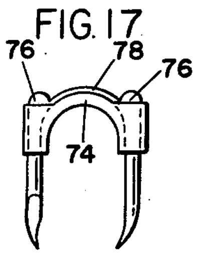

Another form of the insulator is shown in FIGS. 16 and 17. In this case, the insulator is molded with a raised dome-like bridge or head member 72 and the leg members at 74 which accommodate the legs of the staple are spaced somewhat from the head members of the staple indicated at 76. However, as shown in FIG. 17, the conduit or cable will cause the insulator at 72 to be relatively moved upwardly along the legs of the staple and to deform the head thereof which is indicated at 78. FIG. 16 shows the staple as it is supplied to the customer while FIG. 17 shows it as it looks in use.

Figure 18:
Figure 19:
Figure 20:

FIGS. 18, 19 and 20 are illustrative only of different shapes that these plastic insulators might take, and it is pointed out that these insulators may be provided in any degree of rigidity to conform with the deformable head to be suitable to the use desired. One excellent plastic material for this purpose is polyethylene which is obtainable in different degrees of hardness.

FIGS. 21, 22 and 23 illustrate a slight modification of the invention which is very similar to that shown in FIGS. 2 and 5 but in this case the control device instead of being an upstanding knob comprises instead the inner shoulders of the slanted striking heads, such as at 36 and 38 in FIGS. 2 or 4, without the central control knob. In the case of FIG. 21, the staple is provided with legs 80 and 82 which are similar to those at 10 and 12 and at the tops of these legs there are provided the raised striking heads 84 and 86 which slant downwardly and inwardly toward the center, having risers or shoulders as indicated at 88 and 90, and these correspond to the configuration shown in FIGS. 2 at 36 and 38. Connecting these slanting striking heads is a wide, flat, thin, deformable bridge member 92 and again this is similar to that at 20 in FIG. 2 but in this case there is no knob or protruberance extending upwardly as is shown at 40 in FIG. 2.

However, the action is very similar to that above fully explained as to FIGS. 2 and 5 except that in the case of FIGS. 21 to 23 the control device is not a protruberance but comprises the shoulders 88 and 90 at the inner ends of the slanted driving heads, and the effect of this is illustrated step-by-step in FIGS. 22 and 23, where the hammer is illustrated at 94 and the cable, etc. at 96.

With the legs of the staple straddling the object 96 as usual, and the hammering taking place, the hammer of course strikes the tops of the slanted heads 84 and 86 the same as it did with respect to those at 22 and 24 above described. The central part of the bridge, i.e., the flat widened deformable bridge portion 92, contacts the object to be secured and starts to relatively rise (FIG. 22), as the legs are pounded down into the foundation or other supporting structure, the surface of which is indicated at 98. As this happens, instead of the hammer contacting the protuberance 40 as in FIG. 5, the action continues with the tapering slanted driving heads between 88 and 84 and 90 and 86 (see FIG. 21) rising relatively upwardly so that the top surface of the staple in FIG. 23 is indicated at 100 becomes substantially horizontal or flat.

In this case the benefits derived from the construction are the same as those before as fully set forth above but do not depend upon the control device 40 but instead upon the shape, thinness and deformability of the central bridge member at 92 and upon the shoulders 88 and 90, which comprise a control device because the legs 80 and 82 are caused to cease their driving action into the support 98. It should be noted that the action of the deformable bridge member automatically changes the hammer contact points from the high outside points 84 and 86 over the legs to the central portion of the head on contact with the objects to be held, thus stopping all harmful further progress of the legs which cannot be further struck by a hammer when the deformed central portion of the head rises above the outside shoulders over the legs, (FIG. 23). The action can be said to be self-setting and the staples are much easier and more accurate to use as well as including all of the beneficial results referred to above.

Having thus described my invention and the advantages thereof, I do not wish to be limited to the details herein disclosed, otherwise than as set forth in the claims, but what I claim is:

1. A driven cable staple of generally U shape comprising a pair of spaced generally parallel legs and a connecting bridge connecting one end of said legs, the other free ends of said legs being sharpened to form penetrating points, said connecting bridge being centrally depressed, forming a flat, wide, deformable portion for contact with a cable to be secured to an object, said deformable portion being thin relative to the thickness of said legs whereby it is capable of deflecting upward under contact with said cable, a pair of spaced raised striking heads at the ends of said connecting bridge, said heads being generally aligned with the legs, and said striking heads being provided with inwardly and downwardly slanting hammer contact surfaces extending from a generally central location of said striking heads toward said deformable portion and merging therewith, said central locations of the driving heads being generally aligned with the axis of said legs, whereby a hammer blow is directed centrally of said legs straight down to the sharpened points, said slanting hammer contact surfaces gradually rising relative to the object to be held as the thin, wide, flat deformable portion contacts the cable to be secured, whereby when the thin, flat, deformable portion is stopped in its downward progression by the cable and is deflected upward the top central portion thereof then extends substantially in a line with the striking heads at the upper surface thereof, limiting any further penetration of the points and stopping hammer blows on the striking head.

2. The cable staple of claim 1 wherein the deformable central portion includes an additional knob on the upper surface of the bridge.

3. The staple of claim 1 wherein the deformable central portion comprises a bar from edge to edge of the central portion.

4. The cable staple of claim 1 wherein said striking heads taper down inwardly from the outside aspects thereof toward the thin, flat, wide, deformable portion of the bridge.

5. The driven cable staple of claim 1 including shoulders at the inward terminal points of the slanting hammer contact surfaces adjacent the flat portion of the bridge.

References Cited by the Examiner

UNITED STATES PATENTS

| | | | |
|---|---|---|---|
| 368,423 | 8/87 | Remus | 85—49 |
| 506,861 | 10/93 | Prentice | 85—49 |
| 517,836 | 4/94 | Bradish | 85—49 |
| 589,584 | 9/97 | Swett | 85—49 |
| 662,587 | 11/00 | Blake | 248—71 |
| 1,736,807 | 11/29 | Thomas | 85—49 |
| 2,309,536 | 1/43 | Reid et al | 85—49 |
| 2,351,608 | 6/44 | Greenwood | 85—49 |
| 2,632,356 | 3/53 | Thiel | 85—49 |
| 2,887,004 | 5/59 | Stewart | 85—49 |
| 3,077,812 | 2/63 | Dietrich | 85—49 |

FOREIGN PATENTS

| | | |
|---|---|---|
| 707,661 | 4/34 | France. |
| 793,859 | 4/58 | Great Britain. |

EDWARD C. ALLEN, *Primary Examiner.*

CARL W. TOMLIN, *Examiner.*